United States Patent
Srinivasan et al.

(10) Patent No.: US 7,031,469 B2
(45) Date of Patent: Apr. 18, 2006

(54) OPTIMIZED ENVELOPING VIA KEY REUSE

(75) Inventors: Andre Srinivasan, San Francisco, CA (US); Robert Meadows, Redwood City, CA (US)

(73) Assignee: Slam Dunk Networks, Inc., San Mateo, CA (US)

( * ) Notice: Subject to any disclaimer, the term of this patent is extended or adjusted under 35 U.S.C. 154(b) by 744 days.

(21) Appl. No.: 10/033,705

(22) Filed: Dec. 27, 2001

(65) Prior Publication Data
US 2003/0123672 A1 Jul. 3, 2003

(51) Int. Cl.
*H04L 9/00* (2006.01)

(52) U.S. Cl. .................. 380/30; 380/285; 380/282

(58) Field of Classification Search ............... 380/285, 380/282, 45
See application file for complete search history.

(56) References Cited

U.S. PATENT DOCUMENTS 5,857,020 A * 1/1999 Peterson, Jr. ................ 705/52
5,907,621 A * 5/1999 Bachman et al. ........... 713/155
6,061,452 A * 5/2000 Suzuki ....................... 380/231
6,195,433 B1 * 2/2001 Vanstone et al. ........... 380/285

\* cited by examiner

*Primary Examiner*—Ayaz Sheikh
*Assistant Examiner*—Pramila Parthasarathy
(74) *Attorney, Agent, or Firm*—McDermott Will & Emery LLP

(57) ABSTRACT

The present invention provides optimized enveloping for a public key cryptography system. A sender may reuse a secret key in multiple communications to a recipient without the need to recompute or re-encrypt the secret key. The first time a message is sent to a recipient, the sender generates and encrypts a secret key, then stores the secret key, the encrypted secret key, and associated counter data in a local data store. For subsequent messages to the recipient, the sender determines from the counter data whether the secret key may be reused; if the secret key is reused, the sender updates the counter data. A recipient stores previously received secret keys in a local data store in both encrypted and decrypted form. If an encrypted secret key in a received message matches an entry in the local data store, the recipient uses the previously decrypted secret key to decrypt the message.

4 Claims, 3 Drawing Sheets

OPTIMIZED ENVELOPING VIA KEY REUSE

BACKGROUND OF THE INVENTION

The invention relates in general to secure electronic communication and in particular to encryption systems and methods for providing privacy in electronic communication.

When an electronic message is sent via the Internet, the message generally travels through a number of gateways, routers, and other intermediaries between the sender and the recipient. While the message is in transit, third parties may have access to the message, so that privacy of the communication cannot be presumed. For that reason, parties using the Internet to transmit sensitive data (e.g., credit card information or business transaction information) usually desire to send encrypted messages that can be decrypted only by the intended recipient.

Communication of encrypted messages generally requires establishing a "shared secret" known to both the sender and recipient but not known to any third party. The shared secret typically acts as a key that can be used to encrypt and decrypt messages. Various techniques for establishing a shared secret are known. For instance, in secure socket layer (SSL) systems frequently used for secure World Wide Web connections between a client (browser) and server, the client and server establish a shared secret by having each entity apply the same algorithm to various data known to both (and unknown to third parties), without transmitting the secret across the Internet.

Despite initial appearances to the contrary, public key encryption also involves shared secrets. In a public key encryption system, each sender and each recipient has a public key and a private key, which typically are a pair of large numbers (e.g., 1024 or 2048 bits) mathematically related such that messages encrypted using the public key with an appropriate asymmetric encryption algorithm may only be decrypted using the corresponding private key, and vice versa. That is, if the sender encrypts a message using the recipient's public key, the recipient can then use its own private key to decrypt the message. If the recipient keeps its private key a secret from everyone, then third parties will not be able to decrypt the message. In practice, however, complete messages are usually not encrypted using the recipient's public key for a variety of reasons. For instance, public key encryption algorithms are computationally expensive due to the size of the keys and the complexity of asymmetric encryption algorithms, making public key encryption a slow process.

To avoid such problems, public key encryption systems are usually implemented using "enveloping." A message sender generates a random secret key for encrypting the message. The encryption algorithm used is symmetric, i.e., the same secret key may be used to decrypt the message. Because these secret keys are smaller than private or public keys and because a symmetric encryption algorithm is used, the computing power required is considerably less than for public key encryption. In order to share the secret key with the recipient, the sender encrypts the secret key using the recipient's public key. The encrypted message and the encrypted secret key are then sent together to the recipient as an "enveloped" message. Enveloping typically reduces the amount of data to be encrypted with the recipient's public key. Moreover, because each secret key is a random number, the risk that an eavesdropper will be able to deduce the secret key from patterns in the encrypted data is significantly reduced. Upon receipt of the message, the recipient uses its private key to decrypt the secret key, then uses the secret key to decrypt the message.

Existing enveloping systems, however, still incur significant computational overhead on both the sender and the recipient sides due to the use of public key cryptography. The sender must generate a secret key for each message and encrypt it with the recipient's public key, a time-consuming process. The recipient must then decrypt the secret key using his private key, which again takes time. This overhead limits the speed at which communication can take place.

BRIEF SUMMARY OF THE INVENTION

The present invention provides optimized enveloping that may reduce the computational overhead associated with public key cryptography. According to the present invention, a sender may reuse a secret key in multiple communications to a recipient without the need to recompute or re-encrypt the secret key. A recipient is able to identify messages wherein a secret key has been reused so that the recipient may decrypt the message without repeating the decryption of the secret key. Reuse of a secret key is controlled by criteria established to provide acceptable assurance that the secrecy of the secret key has not been compromised. Reduced computational overhead and enhanced speed of communication may thus be realized without compromising message secrecy.

According to one aspect of the invention, in a public key encryption system, a method for selecting a current secret key to be used to encrypt a message is provided. When a message is to be sent, it is first determined whether a new secret key is required. If a new secret key is required, the new secret key is generated, then a new encrypted secret key is generated by encrypting the new secret key using a public key associated with a recipient of the message. The new secret key is stored in a local data store as a reusable secret key; the new encrypted secret key is stored as a corresponding reusable encrypted secret key, and counter data associated with the reusable secret key is also stored. State information associated with a cryptographic algorithm in which the reusable secret key is applied may also be stored. The new secret key is then selected as the current secret key. If a new secret key is not required, a reusable secret key and the corresponding reusable encrypted secret key are retrieved from the local data store. The counter data associated with the reusable secret key in the local data store is updated, and the reusable secret key is selected as the current secret key. A message may then be encrypted using the current secret key and sent to the recipient together with the corresponding encrypted secret key.

Determining whether a new secret key is required may comprise first determining whether a previous message has been sent to the recipient. If a previous message has not been sent to the recipient, a new secret key is required. If a previous message has been sent to the recipient, the counter data is retrieved from the local data store and compared to a reuse criterion. If the counter data satisfies the reuse criterion, a new secret key is not required; and if the counter data fails to satisfy the reuse criterion, a new secret key is required. Various reuse criteria may be employed. For instance, the reuse criterion may comprise a maximum number of messages, and the counter data may comprise a cumulative number of messages previously sent using the reusable secret key. Alternatively, the reuse criterion may comprise a maximum number of bytes of message data, and the counter data may comprise a cumulative number of bytes of message data previously sent using the reusable secret key. As another option, the reuse criterion may comprise a maximum amount of elapsed time, and the counter data may comprise an amount of elapsed time since the reusable secret key was generated.

According to another aspect of the invention, a method of decrypting a received message is provided. An encrypted secret key is extracted from the received message. It is then determined whether the encrypted secret key was previously decrypted. If the encrypted secret key was not previously decrypted, the encrypted secret key is decrypted, and the encrypted secret key and the decrypted secret key are stored in a local data store. If the encrypted secret key was previously decrypted, the decrypted secret key is retrieved from the local data store. The message is then decrypted using the decrypted secret key.

Determining whether the encrypted secret key was previously decrypted may comprise searching for the encrypted secret key in the local data store. If the encrypted secret key is found in the local data store, then it is determined that the encrypted secret key was previously decrypted. If the encrypted secret key is not found in the local data store, then it is determined that the encrypted secret key was not previously decrypted.

The following detailed description together with the accompanying drawings will provide a better understanding of the nature and advantages of the present invention.

DETAILED DESCRIPTION OF THE INVENTION

The present invention provides optimized enveloping that reduces the computational overhead associated with public key cryptography. According to the present invention, a sender may reuse a secret key in multiple communications to a recipient without the need to recompute or re-encrypt the secret key each time. To preserve acceptable levels of security, limits are placed on key reuse. Further, according to the present invention, a recipient is able to recognize that a secret key has been reused so that the recipient may decrypt the message without repeating the decryption of the secret key. Reduced computational overhead and enhanced speed of communication are thereby realized without compromising message secrecy.

Figure 1:
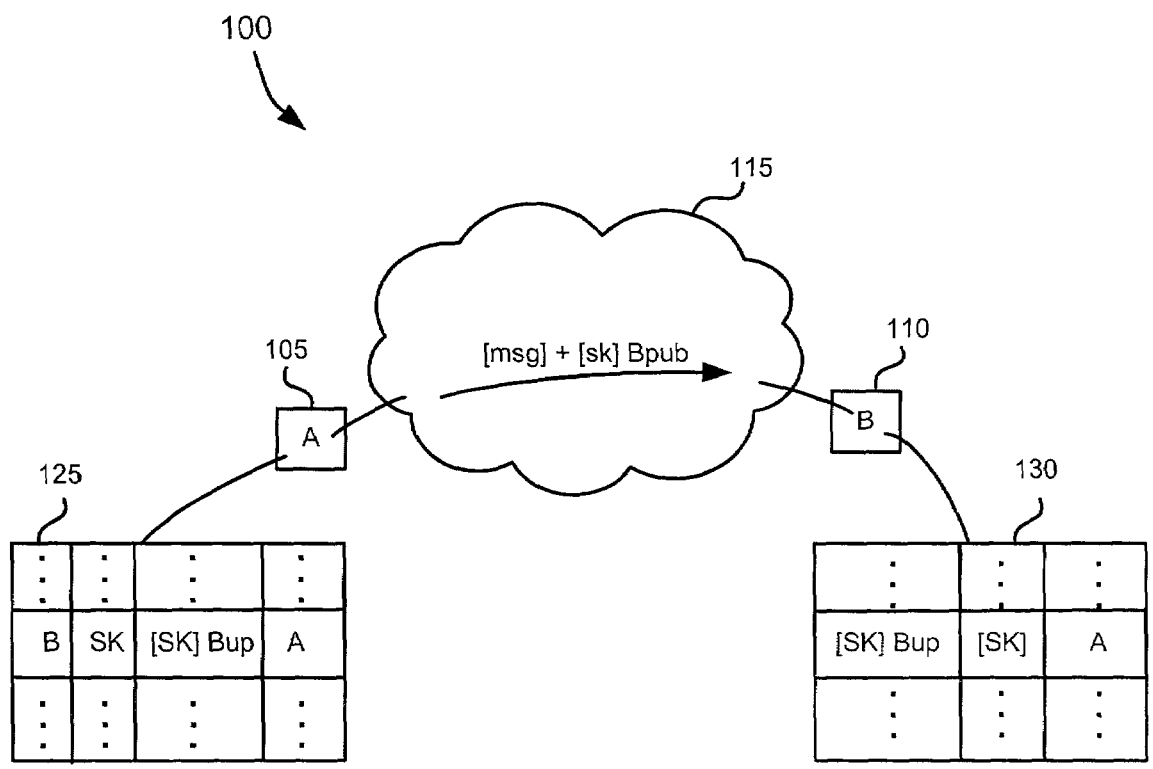
FIG. 1 is a block diagram of an electronic communication system according to the present invention.

FIG. 1 illustrates a system 100 in which the present invention may be practiced. Sender 105 and recipient 10 communicate via network 115. Network 115 may be any network enabling electronic communication among multiple computer systems, for example, the global communication system known as the Internet. Sender 105 and recipient 110 may be human users or components on the network, such as servers or clients or other components, depending on the implementation. Each of sender 105 and recipient 110 employs public key encryption. In particular, recipient 110 has a public key (Bpub) and a private key (Bpriv) (not shown).

Sender 105 has a local data store 125, which contains a data record for each recipient to whom sender 105 has previously sent messages. The data record includes identification of the recipient (B), which may be a component name or unique address associated with the recipient; a secret key (SK) that was used to send a previous message to the recipient B; an encrypted version of the previously used secret key ([SK]Bpub, where the notation [x]y indicates that data x has been encrypted using key y); and counter data (C), which will be described further below.

Recipient 110 has a local data store 130, which contains data records for senders from whom recipient 110 has previously received messages. The data record includes the encrypted secret key [SK]Bpub received from the sender and a decrypted version of the secret key (SK). Data store 130 may also include additional algorithmic state information necessary to use the secret key; the identity of the sender (A) may also be stored to further facilitate searching and maintenance of data store 130. It will be appreciated that each of local data stores 125, 130 may be implemented using magnetic disks, random access memory (RAM) or any other suitable storage technology, and that data records may be implemented using a database or other structured data technology.

Figure 2:
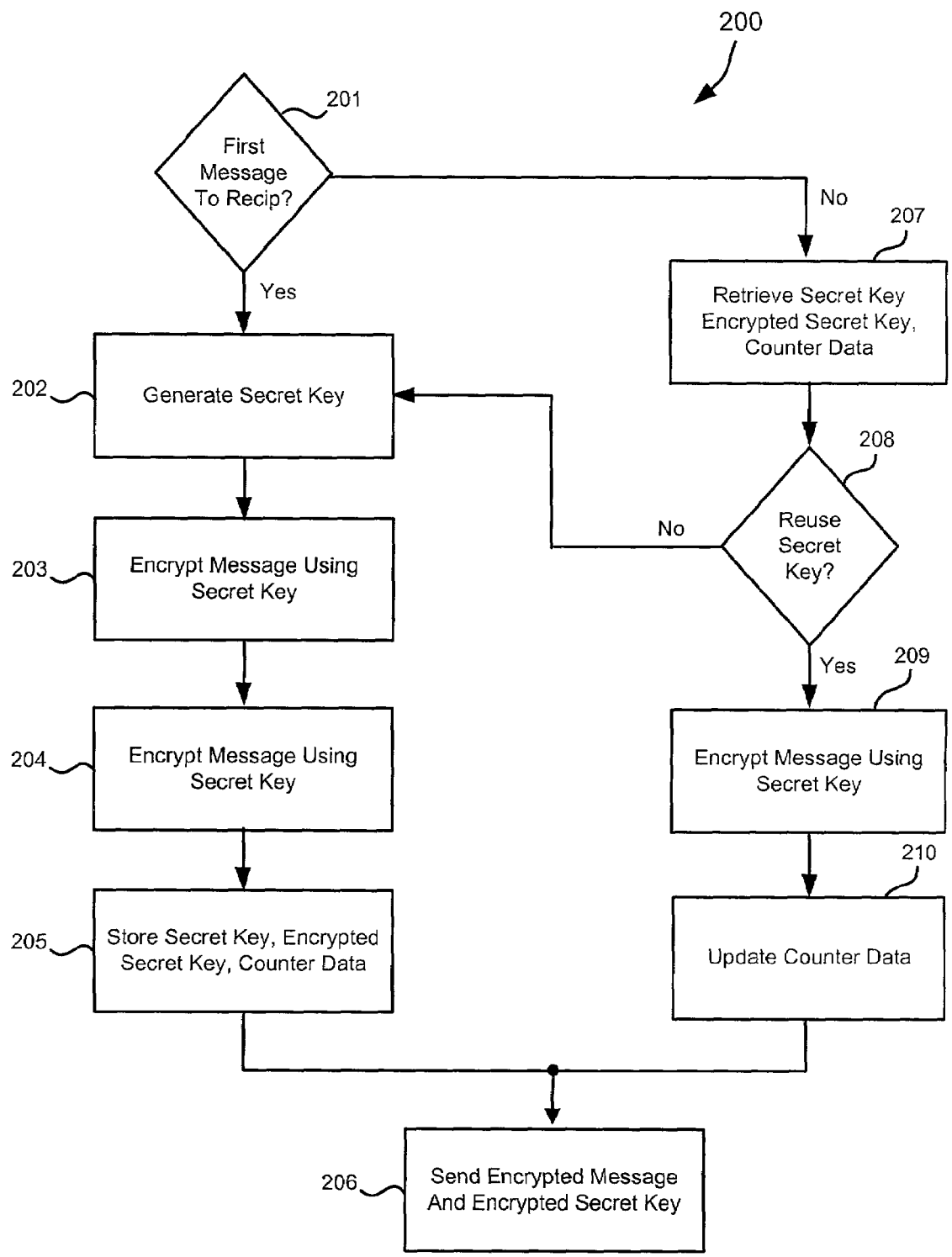
FIG. 2 is a flow chart of a process for sending a message according to the present invention.

FIG. 2 illustrates a process 200 for sending a message according to the present invention. At step 201, sender 105 determines whether the current message (msg) is the first message to recipient 110. For instance, sender 105 may query data store 125 with the identity (B) of recipient 110. If data store 125 contains no entry corresponding to the identity B, then sender 105 treats the current message as the first message to recipient 110. If the current message is the first message, then at step 202, sender 105 generates a secret key (SK). Secret key SK may be generated using any suitable algorithm, for instance, any existing cryptographic pseudo-random number generator. At step 203, sender 105 encrypts the message using the secret key, generating an encrypted message [msg]SK. A symmetric encryption algorithm is employed. At step 204, sender 105 encrypts the secret key using the public key (Bpub) of recipient 110, generating an encrypted secret key [SK]Bpub that may be decrypted only by using the recipient's private key (Bpriv). Sender 105 may obtain public key Bpub through a variety of methods. For instance, sender 105 may maintain a local keystore that contains public key Bpub. Alternatively, sender 105 may obtain the public key by querying recipient 110. Sender 105 may also obtain the public key through an out of band physical exchange. In yet another option, sender 105 may obtain the public key through a secured download facility, possibility integrated into a public key infrastructure used by both sender 105 and recipient 110.

At step 205, sender 105 stores in local data store 125 a record associated with the identity (B) of recipient 110. This record includes the secret key SK and the encrypted secret key [SK]Bpub. This record may also include additional state information needed to apply the cryptographic algorithm. This record also includes counter data for subsequent use in determining whether secret key SK may be reused, as will be described in detail below. In some embodiments, the counter data includes a count of the number of messages sent using secret key SK. Alternatively, the total number of bytes sent using secret key SK may be counted and stored. The counter data may also include the time when secret key SK was generated. At step 206, sender 105 sends message data to the recipient, the message data including the encrypted message [msg]SK and the encrypted secret key [SK]Bpub.

If it is determined at step 201 that the current message is not the first message to recipient 110, then at step 207, sender 105 retrieves secret key SK, encrypted secret key [SK]Bpub, and the counter data C from the local data store 125. At step 208, sender 105 determines whether secret key SK will be reused. This determination is based on the counter data. For example, in some embodiments, a maximum number of messages (e.g., 10) is allowed to be sent with the same secret key. In these embodiments, the counter data includes the number of messages previously sent, which is compared to the maximum number to determine whether the secret key is to be reused. In other embodiments, a maximum number of bytes of message data is allowed to be sent using a particular secret key, and the counter data includes the total number of bytes previously sent using secret key SK. In still other embodiments, the age of the secret key is also taken into account, and the counter data includes a creation time of secret key SK. It will be appreciated that many variations of counter data are possible, corresponding to various conditions, policies, or combinations of conditions and policies that provide an acceptable assurance that secret key SK is not known to third parties.

At step 208, if it is determined that the secret key SK is not to be reused, the data associated with secret key SK is deleted from data store 125, and the process returns to step 202 to generate a new secret key as described above. If it is determined at step 208 that the secret key SK may be reused, then at step 209, the message is encrypted with secret key SK, thereby generating [msg]SK. At step 210, the counter data is updated appropriately. For instance, if the number of messages sent is being counted, the number is incremented. In other embodiments, the number of bytes in the current message may be added to a running total of number of bytes sent. Then, at step 206, the sender sends message to the recipient, the message data including the encrypted message [msg]SK and the encrypted secret key [SK]Bpub. Sender 105 does not need to perform encryption of secret key SK because the previously encrypted secret key [SK]Bpub was retrieved from local data store 125.

Figure 3:
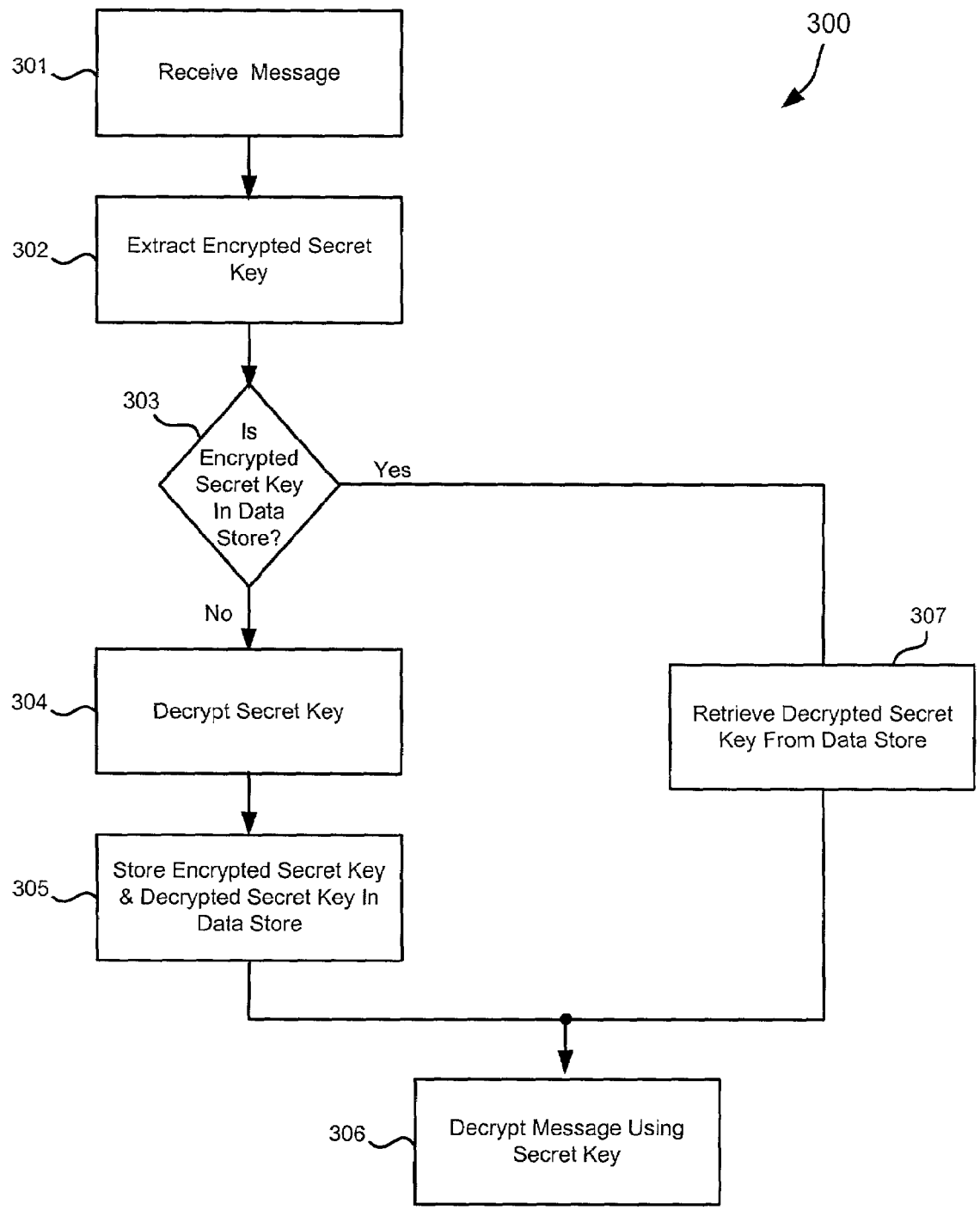
FIG. 3 is a flow chart of a process for receiving a message according to the present invention.

FIG. 3 illustrates a process 300 for receiving a message according to the present invention. At step 301, recipient 110 receives message data from sender 105, the message data including an encrypted message [msg]SK and an encrypted secret key [SK]Bpub that was encrypted using a public key (Bpub) of recipient 110. The message data may have been sent using process 200 of FIG. 2, or another enveloping process. At step 302, recipient 110 extracts the encrypted secret key [SK]Bpub from the message data.

At step 303, recipient 110 searches local data store 130 for the encrypted secret key [SK]Bpub. If the encrypted secret key is not found—as would be the case, for instance, if the message is the first message received from sender 105—then at step 304, recipient 110 decrypts the secret key. At step 305, recipient 110 stores the encrypted secret key [SK]Bpub and the decrypted secret key SK in local data store 130. In some implementations, the identity (A) of sender 105 may also be stored in association with this data. At step 306, recipient 110 proceeds to decrypt the encrypted message [msg]SK using the secret key SK.

If the encrypted secret key [SK]Bpub is found at step 303, recipient 110 does not decrypt the encrypted secret key. Instead, at step 307, recipient 110 retrieves from local data store 130 the previously stored decrypted secret key SK associated with the encrypted secret key [SK]Bpub. Then, at step 306, recipient 110 decrypts the encrypted message.

It will be appreciated that sender 105 does not need to have any information about the content (or even the existence) of the recipient's local data store 130. Sender 105 simply includes the encrypted secret key [SK]Bpub with each message to recipient 110. Recipient 110 determines whether it has a decrypted version of the encrypted secret key; if so, then recipient 110 simply reuses the previous secret key. Thus, the key reuse technique is robust against system failures, restarts, or other events causing loss of data from recipient's local data store 130. For instance, suppose that sender 105 sends a first message to recipient 110. Recipient 110 decrypts the secret key, stores the result, and decrypts the message. Then, unknown to sender 105, recipient 110 crashes and restarts, losing the information in local data store 130. If sender 105 subsequently sends recipient 110 a second message using the same secret key SK, the second message including the encrypted secret key [SK]Bpub, then recipient 110 is able to decrypt the encrypted secret key and store it again before decrypting the second message. On the other hand, if recipient 110 has not crashed or otherwise lost the information in local data store 130, then recipient 110 is able to decrypt the second message more quickly because there is no need to apply a private key decryption algorithm to the encrypted secret key; the decrypted secret key is retrieved from local data store 130.

Similarly, recipient 110 does not need to have information about how many times a secret key SK has been used or whether sender 105 will reuse a particular secret key SK. Thus, the key reuse technique is also robust against system failures, restarts, or other events causing loss of data from sender's local data store 125. For instance, suppose that sender 105 sends a first message to recipient 110. Recipient 110 decrypts the secret key, stores the result, and decrypts the message. Then, unknown to recipient 110, sender 105 crashes and restarts, losing the information in local data store 125. After restarting, sender 105—not knowing that it previously sent a message—sends a second message to recipient 110, generating and encrypting a new secret key in the process. When recipient 110 receives the new encrypted secret key and does not find a match in local data store 130, recipient 110 decrypts the new secret key and stores that information, then proceeds to decrypt the message. On the other hand, if sender 105 has not crashed or otherwise lost the information in local data store 125, sender 105 is able to send the second message more quickly because there is no need to generate and encrypt a new secret key; the previous secret key is reused. In other words, the present invention enables a sender and a recipient to reuse a secret key regardless of whether either the sender or the recipient has knowledge of the other's state.

Although the invention has been described with reference to specific embodiments, it will be appreciated that variations and modifications are possible. For instance, a sender may also receive messages, in which case the sender performs the recipient functions; likewise, a recipient may also perform sender functions if the recipient also sends messages. A sender may employ a key reuse system even when a particular recipient does not, and vice versa. Additionally, the criteria for determining whether a secret key may be reused are not limited to the examples described above; any criterion or combination of criteria that provides acceptable assurance of message secrecy may be used. One skilled in the art will also recognize that digital signatures for message authentication may be implemented in conjunction with the above-described systems and methods; digital signatures may rely on public key cryptography or other digital signature technologies.

Therefore, it will be appreciated that the scope of the invention is not limited by the foregoing description but by the scope of the following claims, including equivalents.

What is claimed is:

1. In a public key encryption system, a method for selecting a current secret key to be used to encrypt a message, the method comprising:

determining whether a new secret key is required, wherein determining whether a new secret key is required further comprises:

determining whether a previous message has been sent to a recipient;

if a previous message has not been sent to the recipient, determining that a new secret key is required, and if a previous message has been sent to the recipient:

retrieving counter data from a local data store; and comparing the counter data to a reuse criterion, wherein the reuse criterion comprises a maximum number of bytes of message data and the counter data comprises a cumulative number of bytes of message data previously sent using an associated reusable secret key;

if the counter data satisfies the reuse criterion, determining that a new secret key is not required; and if the counter data fails to satisfy the reuse criterion, determining that a new secret key is required;

if a new secret key is required;

generating the new secret key;

generating a new encrypted secret key by encrypting the new secret key using a public key associated with the recipient of the message;

storing in the local data store the new secret key as a reusable secret key, the new encrypted secret key as a corresponding reusable encrypted secret key, and counter data associated with the reusable secret key; and selecting as the current secret key the new secret key; and if a new secret key is not required:

retrieving from the local data store a reusable secret key and the corresponding reusable encrypted secret key;

updating the counter data associated with the reusable secret key in the local data store;

selecting as the current secret key the reusable secret key;

encrypting the message using the current secret key; and sending the encrypted message and the encrypted secret key.

2. The method of claim 1, further comprising storing in the local data store state information associated with a cryptographic algorithm in which the reusable secret key is applied.

3. The method of claim 1, wherein the reuse criterion comprises a maximum number of messages and the counter data comprises a cumulative number of messages previously sent using the associated reusable secret key.

4. The method of claim 1, wherein the reuse criterion comprises a maximum amount of elapsed time and the counter data comprises an amount of elapsed time since the associated reusable secret key was generated.

* * * * *